United States Patent [19]

Merjanian

[11] Patent Number: 5,317,485
[45] Date of Patent: May 31, 1994

[54] CONNECTOR AND METHOD FOR COUPLING AN END OF A LIGHT-TRANSMITTING CONDUIT

[75] Inventor: John-Michael Merjanian, Burlington, Mass.

[73] Assignee: American Surgical Technologies Corporation, Chelmsford, Mass.

[21] Appl. No.: 72,503

[22] Filed: Jun. 4, 1993

[51] Int. Cl.⁵ ............................................. F21V 8/00
[52] U.S. Cl. .................................... 362/32; 362/457; 385/25; 385/88; 385/92
[58] Field of Search .................... 385/16, 25, 76, 77, 385/88, 90, 92, 117; 362/32, 457

[56] References Cited

U.S. PATENT DOCUMENTS

| | | | |
|---|---|---|---|
| 3,638,013 | 1/1972 | Keller | 362/32 |
| 3,683,167 | 8/1972 | Rishton | 362/32 |
| 3,806,225 | 4/1974 | Codrino | 385/88 |
| 4,268,141 | 5/1981 | Mori et al. | 354/413 |
| 4,414,608 | 11/1983 | Furihata | 362/32 |
| 4,547,039 | 10/1985 | Caron et al. | 385/88 |
| 4,557,554 | 12/1985 | Blanc | 362/32 |
| 4,799,753 | 1/1989 | Breitbarth et al. | 385/33 |
| 4,870,952 | 10/1989 | Martinez | 362/32 |

Primary Examiner—Ira S. Lazarus
Assistant Examiner—Alan B. Cariaso
Attorney, Agent, or Firm—Testa, Hurwitz & Thibeault

[57] ABSTRACT

A connector for coupling an end of a light-transmitting conduit comprises a pivotable socket for mounting adjacent an opening through which light from a light source passes and having a passage therethrough formed to allow an end of a light-transmitting conduit to be coupled to the socket. The connector also comprises a shutter piece extending from the socket so as substantially to block light passing through the opening from entering the passage when the socket is in a first position, and substantially to expose the opening to allow light passing through the opening to enter the passage and pass into the conduit when the socket is in a second position.

8 Claims, 6 Drawing Sheets

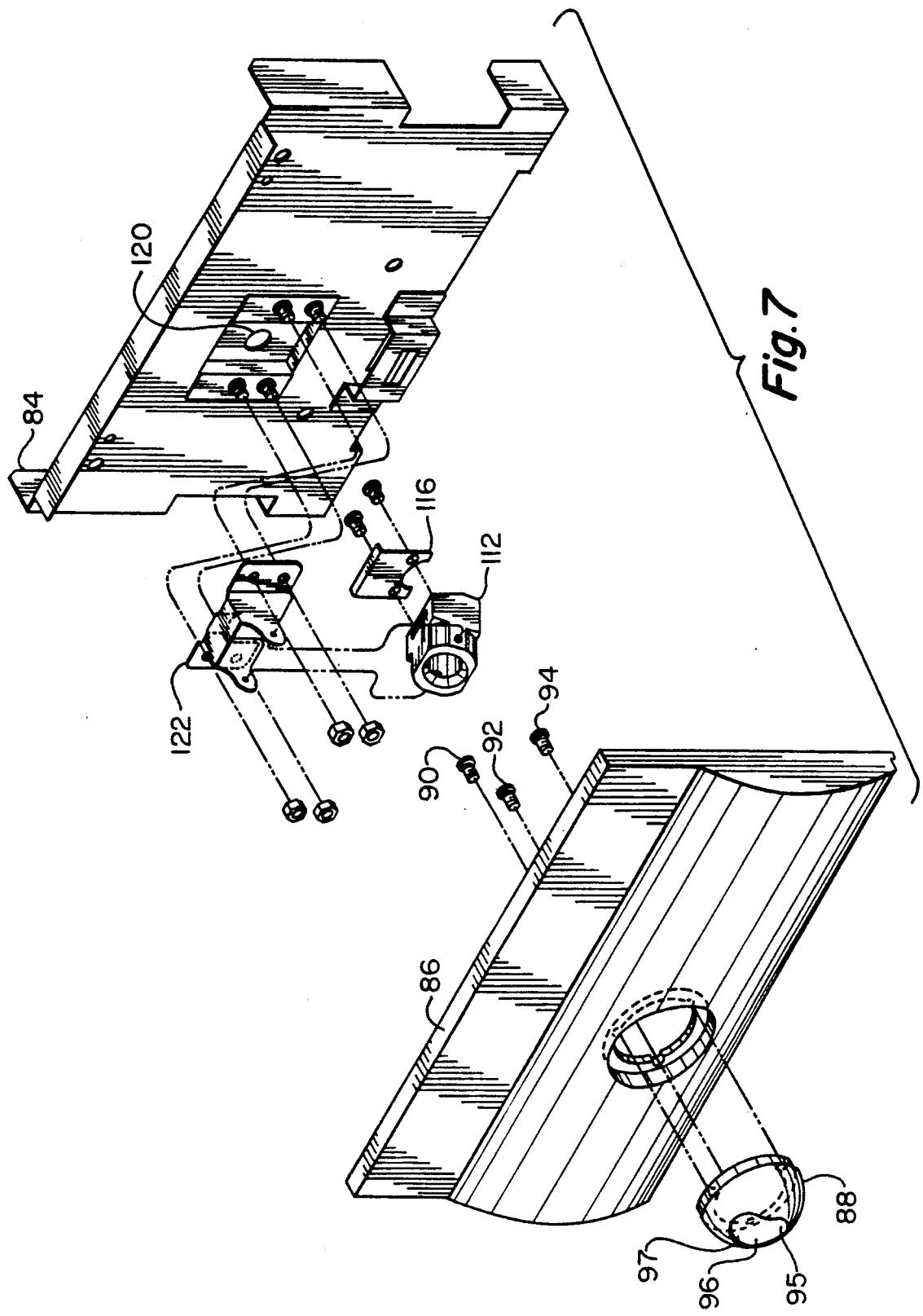

CONNECTOR AND METHOD FOR COUPLING AN END OF A LIGHT-TRANSMITTING CONDUIT

BACKGROUND OF THE INVENTION

This invention relates to a connector and method for coupling an end of a light-transmitting conduit.

Connectors for coupling ends of conduits typically require two hands to operate. An example of a connector requiring two-hand operation is a screw-type cap having a bore therethrough into which the end of the conduit can be inserted. The cap must be loosened manually before the end of the conduit can be inserted into the bore. After loosening and insertion of the end into the bore, the cap is tightened to secure the end in place. An insertion-type connector is another example of a connector requiring two-hand operation. With the insertion-type connector, a spring-loaded leaf plate must be opened with one hand while the end of the conduit is inserted into an exposed opening with the other hand. When released, the leaf plate typically contacts the end of the conduit to secure it in place.

Connectors requiring two-hand operation can be very inconvenient to use, especially in situations such as medical applications where a surgeon (or other medical personnel) typically must perform two tasks simultaneously, one with each hand.

A connector can be disposed on a face plate of a piece of equipment having a light source therein, in which case, the connector is aligned with an opening in the equipment through which light from the light source can pass. The equipment can be, for example, medical equipment such as a part of an endoscopy system or laser system. If an end of a light-transmitting conduit is inserted into the connector on the face of the equipment, light from the light source will pass through the opening into the conduit. Upon removal of the end of the conduit from the connector, light from the light source typically shines (at least momentarily) through the opening and the connector and generally out into an area or room in which the equipment is located.

In many situations such as medical applications including laser surgery and endoscopy, it is desirable to control the light and prevent it from shining out of the equipment. A surgeon and other medical personnel present during a medical procedure typically will be distracted if a bright light is emitted from the equipment whenever a light-transmitting conduit is removed from the equipment. Any distractions to the surgeon or the other personnel can endanger the patient and reduce the chances of a carefully-performed, successful medical procedure.

A connector which provides the convenience of one-hand operation and which prevents bright light from being emitted unchecked therethrough when a conduit end is removed is desired.

SUMMARY OF THE INVENTION

A connector according to the invention can be operated with one hand. The connector prevents light from shining out of an opening when an end of a conduit is de-coupled therefrom. When the end is inserted into the connector such that light is transmitted into the conduit, the end is locked in place to prevent accidental removal from the connector. The connector also can act as a heat sink for the end of the conduit which typically is heated by light transmitted therethrough.

In general, the invention features a connector for coupling an end of a light-transmitting conduit. The connector comprises a pivotable socket for mounting adjacent an opening through which light from a light source passes. The socket has a passage therethrough formed to allow an end of a light-transmitting conduit to be coupled to the socket. The connector also comprises a shutter piece extending from the socket so as substantially to block light passing through the opening from entering the passage when the socket is in a first position. The shutter piece substantially exposes the opening to allow light passing through the opening to enter the passage and pass into the conduit when the socket is in a second position.

In some embodiments, the connector further comprises a stationary bracket for pivotably mounting the socket adjacent the opening to allow the socket to pivot from the first position to the second position. The bracket includes a lip which extends into the passage when the socket is in the second position to contact the end of the conduit and lock the end in the socket. The bracket can be secured to a plate having the opening therethrough.

Other aspects, features, and advantages of the invention will become apparent from the following description and from the claims.

BRIEF DESCRIPTION OF THE DRAWINGS

FIG. 7 is an exploded perspective view of the connector of FIG. 2 including a backing plate, a cover plate, and a cap.

DETAILED DESCRIPTION

Figure 1A:
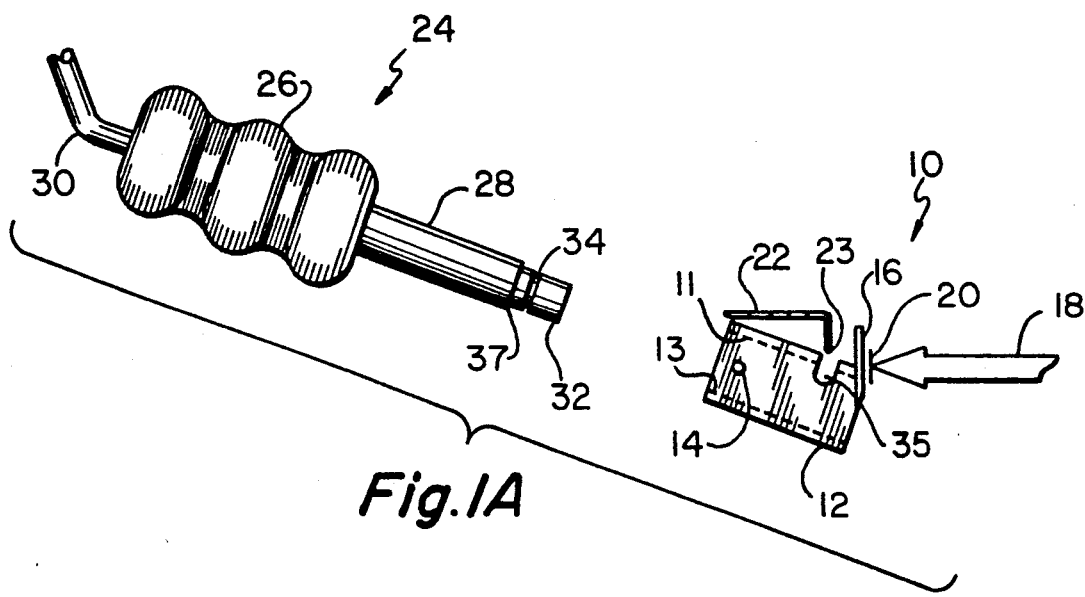
FIGS. 1A and 1B are views of a connector for receiving an adapter end of a light-transmitting conduit according to the invention in, respectively, a first position and a second position.
Figure 1B:
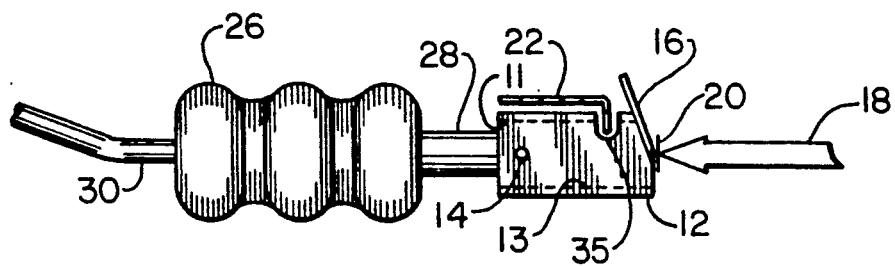

Referring to FIGS. 1A and 1B, a connector 10 according to the invention includes a pivotable socket 12 having a hollow or passage defined therethrough as indicated by dotted lines 11, 13. The socket 12 includes a shutter piece 16 extending therefrom. When the socket 12 is in a first position (FIG. 1A), a beam of light 18 (e.g., from a light source which is not shown) passing through an opening 20 is prevented from entering the passage in the socket 12. In the first position, the shutter piece 16 blocks the light 18 passing through the opening 20. When the socket 12 is in a second position (FIG. 1B), the light 18 passing through the opening 20 is allowed to enter the socket 12. In the second position, the shutter piece 16 does not block the light 18. The socket 12 can pivot from the first position to the second position at a pivot point 14.

In the first position, the socket 12 is disposed at an angle of approximately 20 to 25 degrees from a horizontal axis (not shown) passing through, and parallel to, the light beam 18. While in some embodiments, gravity maintains the socket 12 in this first position, the socket 12 also could be biased (e.g., spring-biased) toward this position. The socket 12 is formed to receive an adapter 24 of a light-transmitting conduit 30. The adapter 24 can include a handle 26 and a plug 28. The plug 28 can include a tip 32 having an annular groove 34 which is engaged by a lip 23 of a locking member 22 to secure the adapter 24 in the socket 12.

In typical use, the light-transmitting conduit 30 is exposed to the light 18 by inserting the adapter 24 into the passage of the socket 12, while the socket 12 is in the first position. After insertion, the weight of the adapter 24 causes the socket 12 to pivot into the second position shown in FIG. 1B. Alternatively, a user can physically move the handle 26 downward to force the socket 12 to move from the first position to the second position. A user need only use one hand to insert the adapter 24 into and remove it from the socket 12.

As the socket 12 pivots from the first position to the second position (with the adapter 24 inserted), the lip 23 of the locking member 22 protrudes into an opening 35 in the socket 12 and into the passage of the socket 12 to contact the annular groove 34 of the tip 32 and thus lock the adapter 24 in the socket 12. With the adapter 24 securely locked into the socket 12 and the socket 12 in the second position, the light 18 passes through the opening 20, the plug 28, the handle 26, and into the light-transmitting conduit 30.

In some embodiments, the passage is sized to receive snugly the plug 28 of the adapter 24 so that the socket 12 draws heat from the adapter 24 and dissipates that heat. Typically, the adapter 24 becomes heated by the light 18 passing therethrough.

The locking member 22 can prevent the adapter 24 from being accidentally removed from the socket 12, e.g., by a tug on the conduit 30. To remove the adapter 24 from the socket 12, a user lifts the adapter 24 upwards such that the socket 12 pivots from the second position of FIG. 1B toward the first position of FIG. 1A. As soon as the socket 12 has pivoted enough to release the annular groove 34 from the lip 23, the adapter 24 can be pulled free of the socket 12. The entire removal process can be performed with one hand.

As the adapter 24 is removed from the socket 12, the socket 12 "falls" into the first position of FIG. 1A, thus preventing the light 18 from (even momentarily) shining out. The more the adapter 24 is removed from the socket 12, the further the socket 12 falls such that the shutter piece 16 completely blocks the opening 20 when the adapter is pulled completely free of the socket 12.

Figure 2:
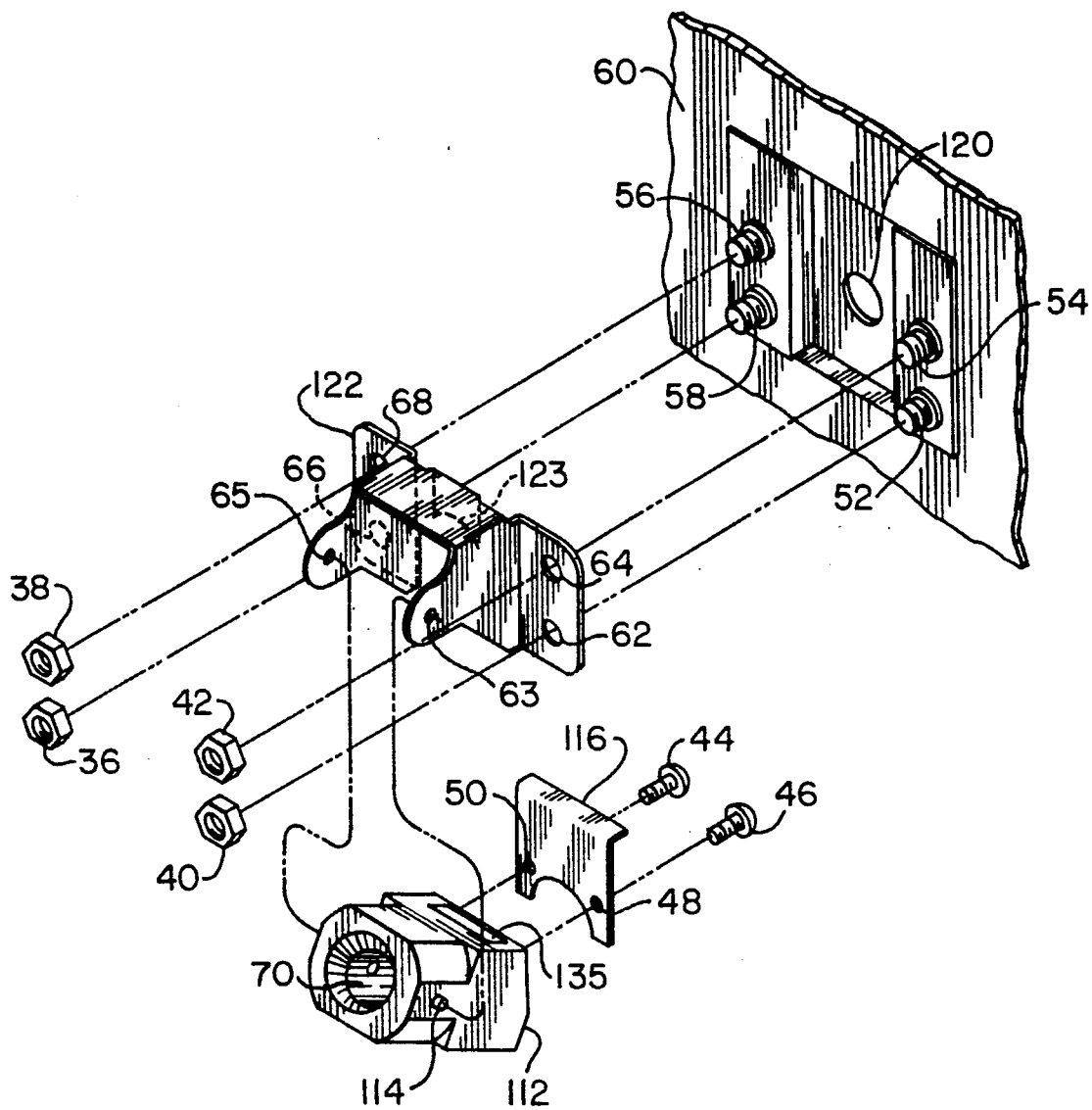
FIG. 2 is an exploded perspective view of an embodiment of a connector according to the invention including a mounting bracket.

Referring to FIG. 2, in one embodiment, a pivotable socket 112 is mounted in a stationary bracket 122 which is secured to a backing member 60 by bolts 52, 54, 56, 58 (or threaded studs) and nuts 36, 38, 40, 42. A shutter piece 116 is attached to the socket 112 with screws 44, 46. While the shutter piece 116 is shown as a separate component, it can be formed integrally with the socket 112. A passage 70 through the socket 112 is formed to accept an adapter of a light-transmitting conduit. The socket 112 includes pivot pins 114 (one on each side of the socket 112) which are received by holes 63, 65 in the bracket 122 and allow the socket 112 to pivot between the first and second positions. The bracket 122 includes a locking lip 123 for protruding into an opening 135 in the socket 112 when the socket 112 is in the second position, i.e., when the passage 70 is aligned with an opening 120 in the backing member 60.

Figure 3A:
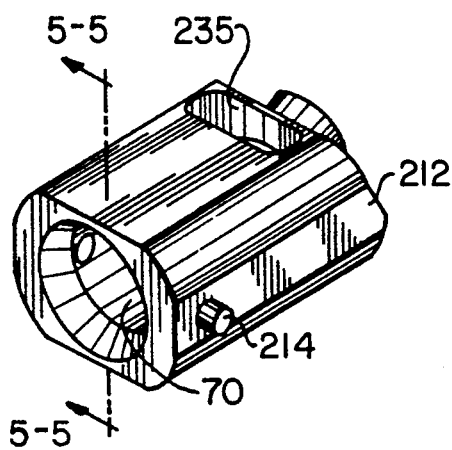
FIGS. 3A and 3B are perspective views of an embodiment of a pivotable socket of a connector according to the invention.
Figure 3B:
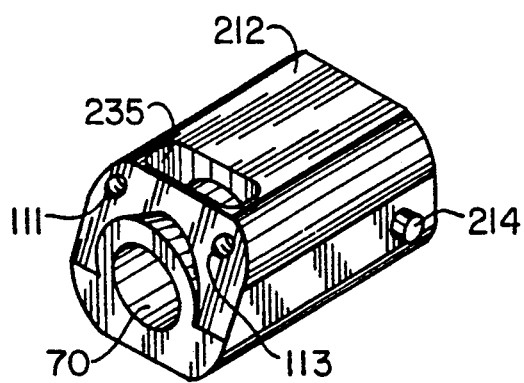
Figure 5B:
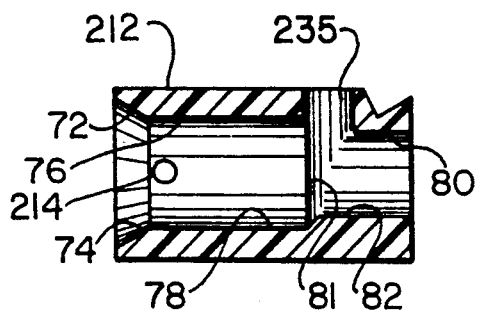
FIGS. 5A and 5B are side views in cross section of the socket, taken along line 5—5 of FIG. 3A.
Figure 5A:
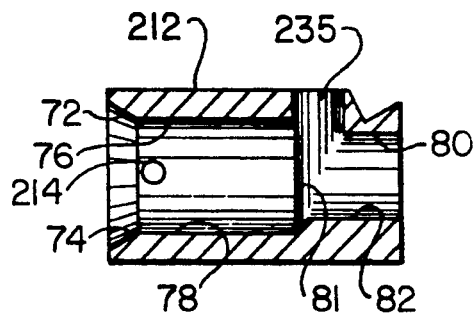
Figure 4:
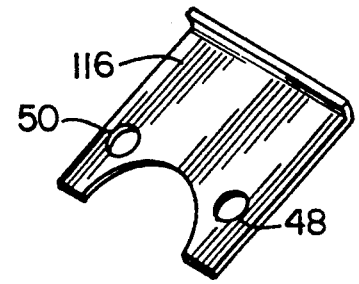
FIG. 4 is a perspective view of a shutter piece for use with the socket of FIGS. 3A and 3B, or of FIG. 2.

Referring to FIGS. 3A and 3B, in another embodiment, a pivotable socket 212 includes pivot pins 214 (one on each side of the socket 212), an opening 235 for receiving a locking lip, and the passage 70. One end of the socket 212 includes holes 111, 113 for alignment with holes 48, 50 of the shutter piece 116 (FIG. 4) to allow the shutter piece 116 to be secured to the socket 212 with screws. As shown in FIGS. 5A and 5B, the socket 212 can be made of a metal such as aluminum or a plastic. In the embodiment of FIGS. 5A or 5B, the passage 70 of the socket 212 is defined by an entrance formed by surfaces 72, 74, a main portion formed by surfaces 76, 78, and an exit portion formed by surfaces 80, 82.

Figure 6:
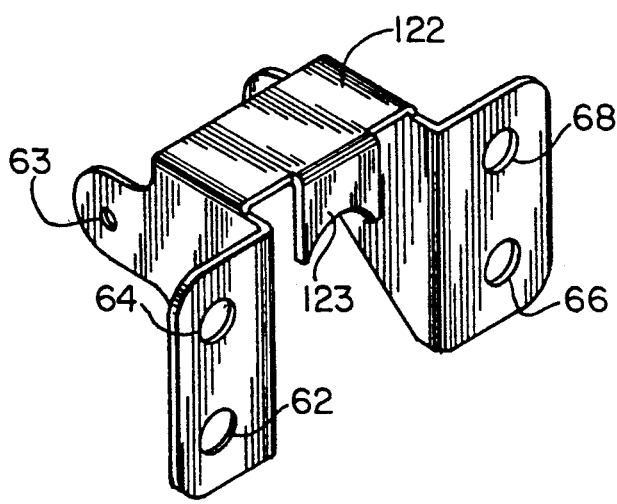
FIG. 6 is a perspective view of the mounting bracket of FIG. 2.

When an adapter of a conduit is inserted into the passage of the socket 212, it is prevented from extending through the exit portion of the passage 70 and out of the socket 212 by a wall 81. In the disclosed embodiment, the plug 28 (FIGS. 1A and 1B) has a ridge or resting surface 37 which contacts the wall 81, and the annular groove 34 thus is located properly for engagement by the locking lip 123 of the bracket 122 (FIGS. 2 and 6). The locking lip 123 is shown more clearly in FIG. 6. The shutter piece 116 of FIGS. 2 and 4 and the bracket 122 of FIGS. 2 and 6 can be made of either metal or plastic.

Referring to FIG. 7, the socket 112, the bracket 122, and the shutter piece 116 (of FIG. 2) can be secured to a backing plate 84 and covered by a cover plate 86. A cap 88 can be secured to the cover plate 86 with screws 90, 92, 94. Alternatively, the cap 88 can be an integral part of the cover plate 86. The cap 88 includes an opening 96 for receiving an adapter of a conduit. The opening 96 has a range which includes a bottom-most point 95 and a top-most point 97. The opening 96 thus allows an adapter of a conduit to be inserted into the socket 112 and to be moved up and down to move the socket 112 between the first and second positions.

Figure 8A:
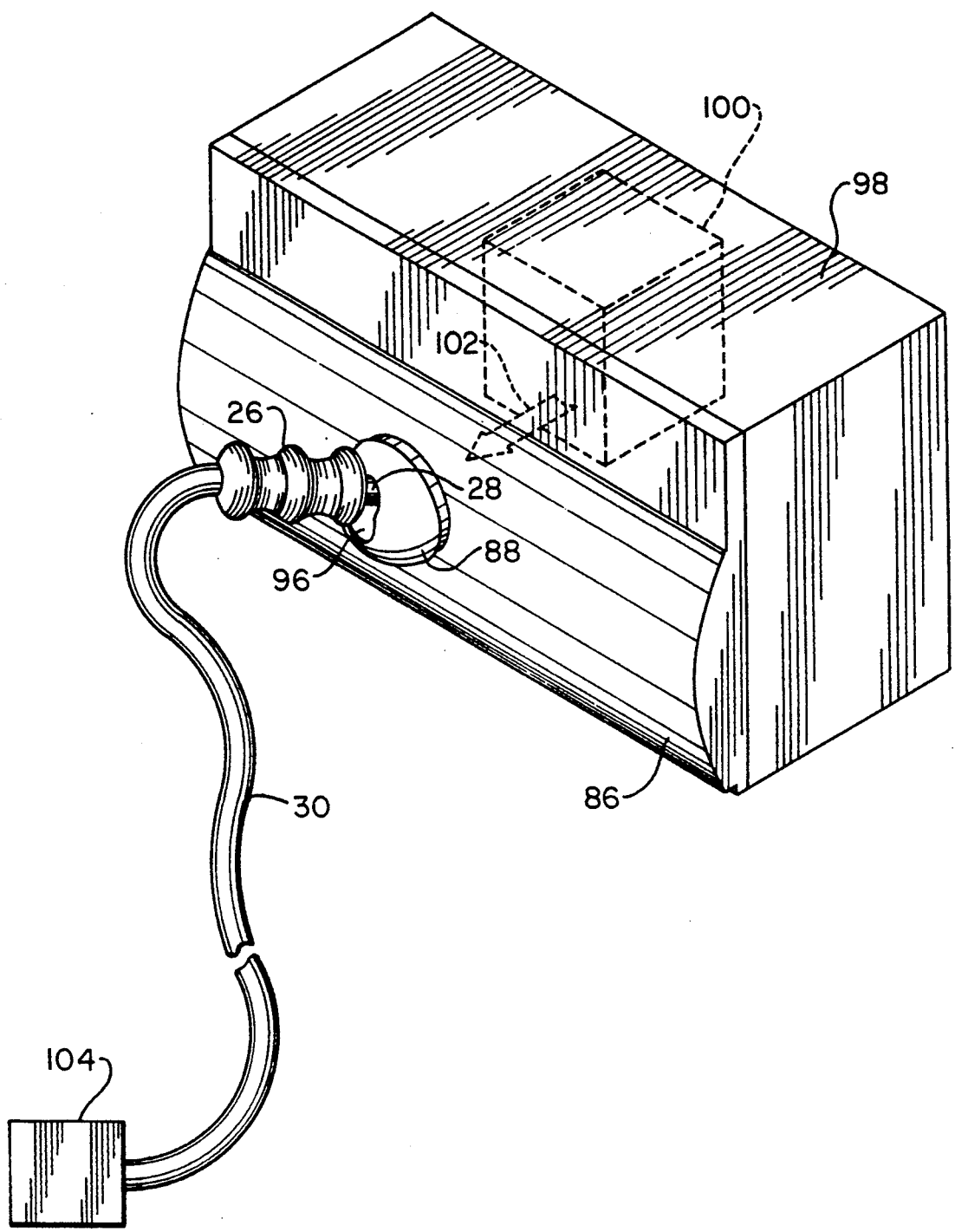
FIGS. 8A and 8B are perspective views of a system including a connector according to the invention in, respectively, a first position and a second position.
Figure 8B:
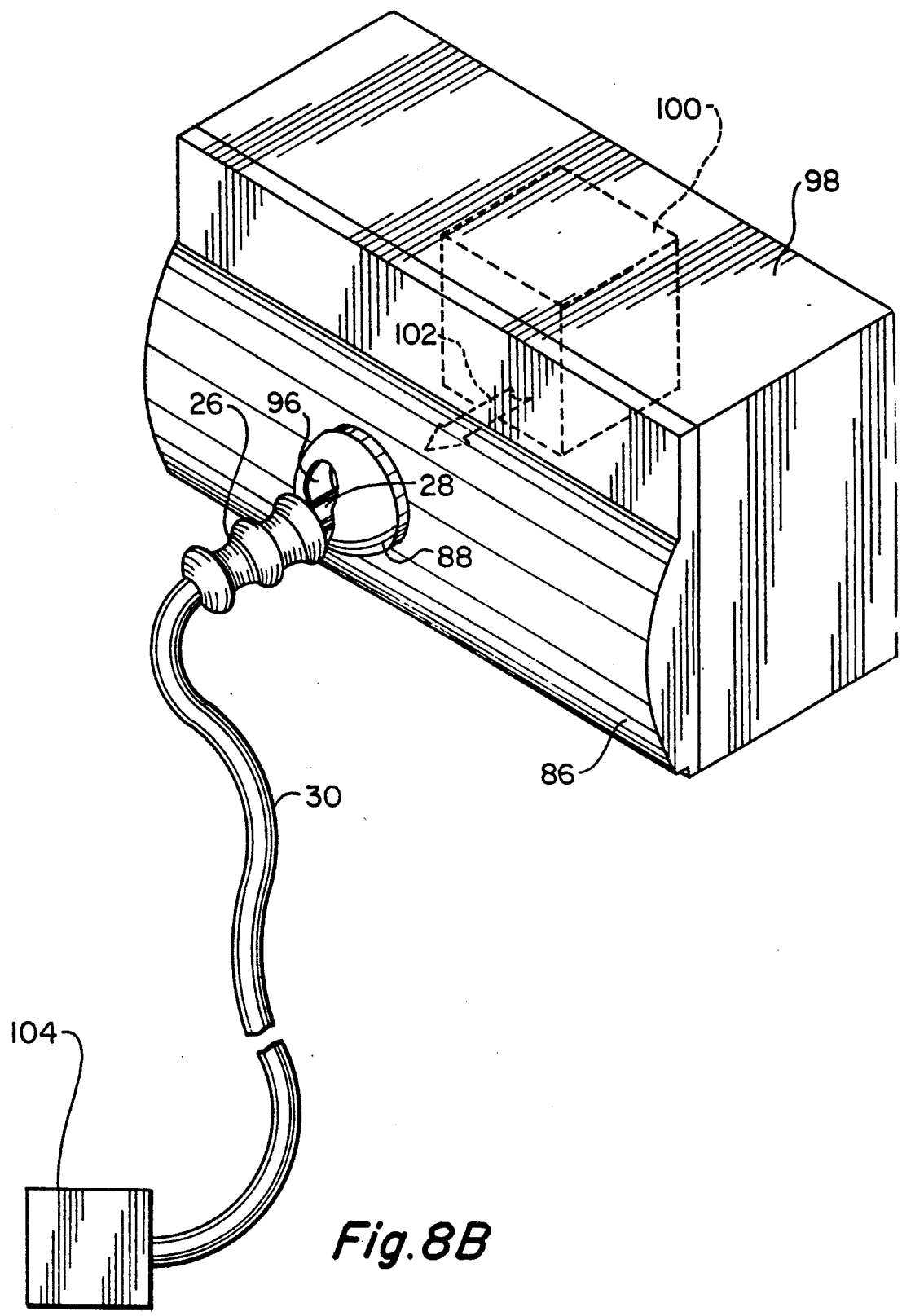

Referring to FIGS. 8A and 8B, a system which includes a connector according to the invention can be a housing 98 with the cover plate 86 and the cap 88. In this embodiment, the housing 98 has a light source 100 therein for producing a path of light 102. The system can be, for example, part of a medical device for use, for example, in endoscopy or laser surgery. An instrument such as an endoscope device or a surgical laser device (represented generally by a box 104) can be coupled to the conduit 30 at an end opposite the handle 26. To transmit the light 102 from the light source 100 to the device 104, the adapter 24 of the light-transmitting conduit 30 is inserted into the opening 96 in the cap 88. Upon initial insertion, the plug 28 is in the top-most point 97 of the range of the opening 96 (FIGS. 7 and 8A). Once the plug 28 is fully inserted into the socket 112, a user can move the handle 26 downwards (or the user can release the handle 26 and allow gravity to pull the adapter 24 downwards) such that the plug 28 is at the bottom-most point 95 of the range of the opening 96 (FIGS. 7 and 8B). With the adapter 24 of the conduit 30 in the position of FIG. 8B, the light 102 can pass into the conduit 30 and to the device 104. As described previously, insertion, locking, unlocking, and removal of the adapter 24 can be performed with a one-hand operation.

In some embodiments, a connector according to the invention can include a male socket for insertion into a female adapter of a conduit, as opposed to the female socket/male adapter combination described previously. The description above generally applies to such a male socket, as one of ordinary skill in the art will appreciate.

While the description has focused on the use of a connector according to the invention in a light-transmission application, it should be realized by those of ordinary skill in the art that such a connector could be used in a variety of other settings. For example, a connector according to the invention can be used to removably couple a garden hose to a water spigot, in which case the connector would block the flow of water from the spigot when in the first position and allow water to flow from the spigot through the hose when the hose is inserted into the connector and the connector is in the second position.

Other modifications and implementations will occur to those skilled in the art without departing from the spirit and the scope of the invention as claimed. Accordingly, the invention is to be defined not by the preceding illustrative description, but by the following claims.

What is claimed is:

1. A connector for coupling an end of a light-transmitting conduit, comprising:
    a pivotable socket for mounting adjacent an opening through which light from a light source passes and having a passage therethrough formed to allow an end of a light-transmitting conduit to be coupled to the socket, and
    a shutter piece extending from the socket so as substantially to block light passing through the opening from entering the passage when the socket is in a first position, and substantially to expose the opening to allow light passing through the opening to enter the passage and pass into the conduit when the socket is in a second position.

2. The connector of claim 1 further comprising a stationary bracket for pivotably mounting the socket adjacent the opening to allow the socket to pivot from the first position to the second position, the bracket including a lip which extends into the passage when the socket is in the second position to contact the end of the conduit and lock the end in the socket.

3. The connector of claim 2 wherein the bracket is secured to a plate having the opening therethrough.

4. The connector of claim 1 wherein the end of the conduit can be inserted into and removed from the socket with one hand, and wherein the socket can be pivoted between the first and second positions with one hand while the end is inserted in the socket.

5. The connector of claim 1 wherein the socket draws heat from the end of the conduit, which is heated by light passing therethrough.

6. The connector of claim 5 wherein the socket comprises metal.

7. A method for coupling an end of a light-transmitting conduit to a connector, comprising:
    providing a connector comprising a pivotable socket having a passage therethrough and including a shutter piece extending therefrom,
    placing the socket in a first position in which the shutter piece substantially blocks light passing through an opening from entering the passage of the socket, and
    coupling an end of a light-transmitting conduit to the socket when the socket is in the first position and then pivoting the socket to a second position to substantially expose the opening and substantially align the passage with the opening to allow the light passing through the opening to enter the conduit.

8. The method of claim 7 wherein the coupling is performed with on hand.

* * * * *